US008722817B2

(12) United States Patent
Karjala et al.

(10) Patent No.: US 8,722,817 B2
(45) Date of Patent: May 13, 2014

(54) PROCESS TO MAKE LONG CHAIN BRANCHED (LCB), BLOCK, OR INTERCONNECTED COPOLYMERS OF ETHYLENE

(75) Inventors: Teresa P. Karjala, Lake Jackson, TX (US); Sean W. Ewart, Pearland, TX (US); Christopher R. Eddy, Lake Jackson, TX (US); Alfred E. Vigil, Jr., Houston, TX (US); Mehmet Demirors, Pearland, TX (US); Sarat Munjal, Lake Jackson, TX (US); Wallace W. Yau, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 214 days.

(21) Appl. No.: 12/959,768

(22) Filed: Dec. 3, 2010

(65) Prior Publication Data

US 2011/0130533 A1   Jun. 2, 2011

Related U.S. Application Data

(63) Continuation-in-part of application No. 12/792,054, filed on Jun. 2, 2010.

(60) Provisional application No. 61/184,409, filed on Jun. 5, 2009.

(51) Int. Cl.
*C08F 2/00* (2006.01)
*C08F 4/76* (2006.01)
*C08F 4/64* (2006.01)
*C08F 8/00* (2006.01)

(52) U.S. Cl.
USPC ............. 526/65; 526/172; 526/138; 526/352; 525/333.8

(58) Field of Classification Search
USPC ...................... 526/161, 352, 65, 87, 172, 348; 525/387, 416, 333.8
See application file for complete search history.

(56) References Cited

U.S. PATENT DOCUMENTS

| | | | |
|---|---|---|---|
| 2,426,833 A | 9/1947 | Lloyd | |
| 3,645,992 A | 2/1972 | Elston | |
| 3,723,403 A | 3/1973 | Greaves et al. | |
| 3,875,128 A * | 4/1975 | Suzuki et al. | 526/65 |
| 4,076,698 A | 2/1978 | Anderson et al. | |
| 4,544,762 A | 10/1985 | Kaminsky et al. | |
| 4,599,392 A | 7/1986 | McKinney et al. | |
| 4,701,432 A | 10/1987 | Welborn, Jr. | |
| 4,798,081 A | 1/1989 | Hazlitt et al. | |
| 4,808,007 A | 2/1989 | King | |
| 4,935,397 A | 6/1990 | Chang | |
| 4,937,301 A | 6/1990 | Chang | |
| 4,950,541 A | 8/1990 | Tabor et al. | |
| 5,015,749 A | 5/1991 | Schmidt et al. | |
| 5,041,584 A | 8/1991 | Crapo et al. | |
| 5,041,585 A | 8/1991 | Deavenport et al. | |
| 5,055,438 A | 10/1991 | Canich | |
| 5,272,236 A | 12/1993 | Lai et al. | |
| 5,278,272 A | 1/1994 | Lai et al. | |
| 5,542,199 A | 8/1996 | Dreisbach et al. | |
| 5,844,045 A | 12/1998 | Kolthammer et al. | |
| 5,869,575 A | 2/1999 | Kolthammer et al. | |
| 6,054,544 A | 4/2000 | Finlayson et al. | |
| 6,448,341 B1 | 9/2002 | Kolthammer et al. | |
| 6,538,070 B1 | 3/2003 | Cardwell et al. | |
| 6,545,088 B1 | 4/2003 | Kolthammer et al. | |
| 6,566,446 B1 | 5/2003 | Parikh et al. | |
| 7,538,173 B2 * | 5/2009 | Schwab et al. | 526/348.1 |
| 8,058,373 B2 | 11/2011 | Stevens et al. | |
| 8,101,696 B2 * | 1/2012 | Konze et al. | 526/172 |
| 8,202,958 B2 * | 6/2012 | Demirors et al. | 526/348 |
| 8,207,277 B2 * | 6/2012 | Beran et al. | 525/333.8 |
| 2007/0117946 A1 * | 5/2007 | Schwab et al. | 526/348.1 |
| 2007/0167578 A1 | 7/2007 | Arriola et al. | |
| 2010/0168330 A1 | 7/2010 | Demoirors et al. | |
| 2010/0311927 A1 * | 12/2010 | Karjala et al. | 526/126 |
| 2011/0130533 A1 * | 6/2011 | Karjala et al. | 526/170 |

FOREIGN PATENT DOCUMENTS

| | | |
|---|---|---|
| EP | 0 260 999 A1 | 3/1988 |
| EP | 0 129 368 B1 | 7/1989 |
| EP | 0323454 A1 | 7/1989 |
| EP | 0 416 815 A2 | 3/1991 |
| EP | 0495099 A1 | 7/1992 |
| FR | 1491215 A | 8/1967 |
| GB | 109028 A | 8/1917 |
| WO | 0021650 A1 | 4/2000 |
| WO | 03/091262 | 11/2003 |
| WO | 2006/020624 A | 2/2006 |
| WO | 2006081116 A1 | 8/2006 |
| WO | 2007075299 A2 | 7/2007 |
| WO | 2007136495 A2 | 11/2007 |
| WO | 2007136496 A2 | 11/2007 |
| WO | 2007136497 A2 | 11/2007 |
| WO | 2007136506 A2 | 11/2007 |
| WO | WO 2007/136506 A2 * | 11/2007 |

OTHER PUBLICATIONS

Folie et al; Ind. Eng. Chem. Res.; 1995, p1501-1516, vol. 34.
Folie and Ruff; Polymer Preprints; 1998, 201-202.
Gotz et al; Macromolecular Materials and Engineering 287 (2002) 16-22.
Luft, G.; Die Angewandte Makromolekulare Chemie 212(1993) 157-166.
Nakano et al, J.; Appl. Polym. Sci., 24, 4217-31 (1981).
PCT/US2010/037035 International Preliminary Report on Patentability, Jun. 5, 2009.
PCT/US2010/037035 International Search Report, Jun. 5, 2009.
PCT/US2010/037035 Written Opinion, Jun. 5, 2009.

* cited by examiner

*Primary Examiner* — Rip A. Lee (57) ABSTRACT

A process is taught, comprising polymerizing ethylene in the presence of a catalyst to form a crystalline ethylene-based polymer having a crystallinity of at least 50% as determined by DSC Crystallinity in a first reactor or a first part of a multi-part reactor and reacting the crystalline ethylene-based polymer with additional ethylene in the presence of a free-radical initiator to form an ethylenic polymer in at least one other reactor or a later part of a multi-part reactor.

10 Claims, 3 Drawing Sheets

PROCESS TO MAKE LONG CHAIN BRANCHED (LCB), BLOCK, OR INTERCONNECTED COPOLYMERS OF ETHYLENE

CROSS-REFERENCE TO RELATED APPLICATIONS

This application is a Continuation-In-Part of U.S. application Ser. No. 12/792,054, filed on Jun. 2, 2010, now pending, which claims the benefit of U.S. Provisional Application No. 61/184,409, filed Jun. 5, 2009; each application is fully incorporated herein by reference.

BACKGROUND OF THE INVENTION

There are many types of polyethylene made and sold today. Two types in particular are made by various suppliers and sold in large quantities. These two types are linear low density polyethylene (LLDPE) and high pressure free radical polyethylene (usually called LDPE). Sometimes polymer users blend these two types of polyethylene together to try to modify properties such as flowability or processability. However, this blending can also bring deficiencies in other physical properties. Thus, it would be advantageous to have similar mechanical properties to LLDPE and also the processability similar to that of LDPE.

We have now discovered new polymers which have the performance attributes of both LLDPE and LDPE.

BRIEF SUMMARY OF THE INVENTION

In one embodiment, the invention is a process comprising:

A) polymerizing ethylene in the presence of a catalyst to form a crystalline ethylene-based polymer having a crystallinity of at least 50% as determined by DSC Crystallinity in a first reactor or a first part of a multi-part reactor; and B) reacting the crystalline ethylene-based polymer with additional ethylene in the presence of a free-radical initiator to form an ethylenic polymer in at least one other reactor or a later part of a multi-part reactor, wherein the catalyst of (A) is a metal complex of a polyvalent aryloxyether corresponding to the formula:

where $M^3$ is Hf or Zr, preferably Zr;

$Ar^4$ independently each occurrence is a substituted $C_{9\text{-}20}$ aryl group, wherein the substituents, independently each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks co-planarity with the aryl group to which it is attached;

$T^4$ independently each occurrence is a $C_{2\text{-}20}$ alkylene, cycloalkylene or cycloalkenylene group, or an inertly substituted derivative thereof;

$R^{21}$ independently each occurrence is hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ independently each occurrence is hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and

$R^D$, independently each occurrence is halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group, especially where the reaction of step (B) occurs by graft polymerization.

Preferably, polar compounds, if present in the first reactor or the first part of a multi-part reactor, do not inhibit the activity of the metallocene catalyst.

In another embodiment, the invention is a process comprising:

A) polymerizing ethylene in the presence of a catalyst to form a crystalline ethylene-based polymer having a crystallinity of at least 50% as determined by DSC Crystallinity in a first reactor or a first part of a multi-part reactor; and B) reacting the crystalline ethylene-based polymer with additional ethylene in the presence of a free-radical initiator to form an ethylenic polymer in at least one other reactor or a later part of a multi-part reactor, wherein the catalyst of (A) is a metal complex of a polyvalent aryloxyether corresponding to the formula:

where $M^3$ is Ti;

$Ar^4$ independently each occurrence is a substituted $C_{9\text{-}20}$ aryl group, wherein the substituents, independently each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks co-planarity with the aryl group to which it is attached;

$T^4$ independently each occurrence is a $C_{2\text{-}20}$ alkylene, cycloalkylene or cycloalkenylene group, or an inertly substituted derivative thereof;

$R^{21}$ independently each occurrence is hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ independently each occurrence is hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$, independently each occurrence is halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group. Preferably each polymerization step (A) and (B) comprises a high pressure polymerization process. In either embodiment, preferably step (A) is performed at a temperature of from about 50 to about 350° C. and/or at a pressure from about 100 psi to about 60,000 psi.

Also preferably, the ethylenic polymer of either embodiment has a gpcBR value greater than 0.05 as determined by a gpcBR Branching Index. The highly branched ethylene-based polymer, when formed separately from the embodiments listed above, can have a gpcBR value of greater than 0.05.

DETAILED DESCRIPTION OF THE INVENTION

Currently, when a high crystallinity, ethylene-based polymer is used with a low crystallinity, highly long chain branched ethylene-based polymer, there is no mechanical means to create a blend that faithfully combines all the physical performance advantages of the ethylene-based polymer with the all the favorable processing characteristics of the highly long chain branched ethylene-based polymer. Disclosed are compositions and methods that address this shortcoming.

In order to achieve an improvement of physical properties over and above a mere physical blend of a ethylene-based polymer with a highly branched ethylene-based polymer, it was found that bonding the two separate constituents—an crystalline ethylene-based polymer and a highly long chain branched ethylene-based polymer—results in an ethylenic polymer material with physical properties akin to or better than the ethylene-based polymer component while maintaining processability characteristics akin to the highly long chain branched ethylene-based polymer component. It is believed that the disclosed ethylenic polymer structure is comprised of highly branched ethylene-based polymer substituents grafted to or free-radical polymerization generated ethylene-based long chain polymer branches originating from a radicalized site on the ethylene-based polymer. The disclosed composition is an ethylenic polymer comprised of a crystalline ethylene-based polymer with long chain branches of highly long chain branched ethylene-based polymer.

The combination of physical and processing properties for the disclosed ethylenic polymer is not observed in mere blends of ethylene-based polymers with highly long chain branched ethylene-based polymers. The unique chemical structure of the disclosed ethylenic polymer is advantageous as the ethylene-based polymer and the highly long chain branched ethylene-based polymer substituent are linked. When bonded, the two different crystallinity materials produce a polymer material different than a mere blend of the constituents. The combination of two different sets of branching and crystallinity materials results in an ethylenic polymer with physical properties that are better than the highly long chain branched ethylene-based polymer and better processiblity than the ethylene-based polymer.

An inventive process may comprise a combination of two or more embodiments as described herein.

The invention also provides an ethylenic polymer formed from an inventive process as described herein.

In one embodiment, the melt index of the ethylenic polymer may be from about 0.01 to about 1000 g/10 minutes, as measured by ASTM 1238-04 (2.16 kg and 190° C.).

In one embodiment, the ethylenic polymer has a DSC peak melting temperature (° C.) according to the equation: $Tm > 0.2143 \ (g/J) \times (H_f(J/g)) + 79.643(° C.)$.

In one embodiment, the ethylenic polymer has a DSC peak melting temperature (° C.) according to the equation: $Tm \geq 0.2143 \ (g/J) \times (H_f(J/g)) + 81(° C.)$.

In one embodiment, the ethylenic polymer has a percent crystallinity greater than 50 percent, preferably greater than 55 percent, and more preferably greater than 60 percent, as determined by DSC.

In one embodiment, the ethylenic polymer has a molecular weight distribution from 30 to 50.

An ethylenic polymer may comprise a combination of two or more embodiments as described herein.

Crystalline Ethylene-Based Polymers

The crystalline ethylene-based polymer may comprise units derived from one or more α-olefin copolymers as long as there is at least 50 mole percent polymerized ethylene monomer in the polymer.

The crystalline ethylene-based polymer can be a high density polyethylene (HDPE) and may have a density in the range of about 0.94 to about 0.97 g/cm³. HDPE is typically a homopolymer of ethylene or an interpolymer of ethylene and low levels of one or more α-olefin copolymers. HDPE can be comprised of less than 5 mole % of the units derived from one or more α-olefin comonomers The crystalline ethylene-based polymer can be a linear ethylene-based polymer such as linear low density polyethylene and ultra low density polyethylene (ULDPE) are characterized by an absence of long chain branching, in contrast to conventional low crystallinity, highly branched ethylene-based polymers such as LDPE.

The crystalline ethylene-based polymer can be a copolymer of ethylene and at least one α-olefin comonomer, which may have, for example, from 3 to 20 carbon atoms. Preferably, the α-olefin comonomer may have 3 to 8 carbon atoms. Exemplary α-olefin comonomers include, but are not limited to, propylene, 1-butene, 3-methyl-1-butene, 1-pentene, 3-methyl-1-pentene, 4-methyl-1-pentene, 1-hexene, 1-heptene, 4,4-dimethyl-1-pentene, 3-ethyl-1-pentene, 1-octene, 1-nonene, 1-decene, 1-dodecene, 1-tetradecene, 1-hexadecene, 1-octadecene and 1-eicosene. A copolymer may incorporate an α,ω-olefin comonomer.

The crystalline ethylene-based polymer can be a "substantially linear ethylene polymer" which refers to homogeneously branched ethylene polymers that have long chain branching. The term does not refer to heterogeneously or homogeneously branched ethylene polymers that have a linear polymer backbone. The polymer backbone of substantially linear ethylene polymers is substituted with about 0.01 long chain branches/1000 carbons to about 3 long chain branches/1000 carbons, more preferably from about 0.01 long chain branches/1000 carbons to about 1 long chain branches/1000 carbons, and especially from about 0.05 long chain branches/1000 carbons to about 1 long chain branches/1000 carbons.

Homogeneously branched ethylene polymers are homogeneous ethylene polymers that possess short chain branches and that are characterized by a relatively high composition distribution breadth index (CDBI). That is, the ethylene polymer has a CDBI greater than or equal to 50 percent, preferably greater than or equal to 70 percent, more preferably greater than or equal to 90 percent and essentially lack a measurable high density (crystalline) polymer fraction.

The CDBI is defined as the weight percent of the polymer molecules having a co-monomer content within 50 percent of the median total molar co-monomer content and represents a comparison of the co-monomer distribution in the polymer to the co-monomer distribution expected for a Bernoullian distribution. The CDBI of polyolefins can be conveniently calculated from data obtained from techniques known in the art, such as, for example, temperature rising elution fractionation ("TREF") as described, for example, in Wild, et al., *Journal of Polymer Science*, Poly, Phys. Ed., Vol. 20, 441 (1982); L. D. Cady, The Role of Comonomer Type and Distribution in LLDPE Product Performance," *SPE Regional Technical Conference*, Quaker Square Hilton, Akron, Ohio, 107-119 (Oct. 1-2, 1985); or in U.S. Pat. No. 4,798,081 (Hazlitt, et al.) and U.S. Pat. No. 5,008,204 (Stehling). However, the TREF technique does not include purge quantities in CDBI calculations. More preferably, the co-monomer distribution of the polymer is determined using $^{13}C$ NMR analysis in accordance with techniques described, for example, in U.S. Pat. No. 5,292,845 (Kawasaki, et al.) and by J. C. Randall in Rev. Macromol. Chem. Phys., C29, 201-317, The terms "homogeneously branched linear ethylene polymer" and "homogeneously branched linear ethylene/α-olefin polymer" means that the olefin polymer has a homogeneous or narrow short branching distribution (that is, the polymer has a relatively high CDBI) but does not have long chain branching, That is, the linear ethylene-based polymer is a homogeneous ethylene polymer characterized by an absence of long chain branching. Homogeneously branched linear ethylene polymers are typically characterized as having a molecular weight distribution, $M_w/M_n$, of less than 3, preferably less than 2.8, more preferably less than 2.3.

The presence of long chain branching can be determined in ethylene homopolymers by using $^{13}C$ nuclear magnetic resonance (NMR) spectroscopy and is quantified using the method described by Randall (*Rev. Macromol. Chem. Phys.*, C29, V. 2&3, 285-297). There are other known techniques useful for determining the presence of long chain branches in ethylene polymers, including ethylene/1-octene interpolymers. Two such exemplary methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, for example, Zimm, G. H. and Stockmayer, W. H., *J. Chem. Phys.*, 17, 1301 (1949), and Rudin, A., *Modern Methods of Polymer Characterization*, John Wiley & Sons, New York (1991) 103-112.

In a further aspect, substantially linear ethylene polymers are homogeneously branched ethylene polymers and are disclosed in both U.S. Pat. Nos. 5,272,236 and 5,278,272 (both Lai et al.). Homogeneously branched substantially linear ethylene polymers can be prepared via the solution, slurry, or gas phase polymerization of ethylene and one or more optional α-olefin comonomers in the presence of a constrained geometry catalyst, such as the method disclosed in European Patent 0415815 (Stevens, et al.).

The terms "heterogeneous" and "heterogeneously branched" mean that the ethylene polymer can be characterized as a mixture of interpolymer molecules having various ethylene to comonomer molar ratios. Heterogeneously branched linear ethylene polymers are available from The Dow Chemical Company as DOWLEX™ linear low density polyethylene and as ATTANE™ ultra-low density polyethylene resins. Heterogeneously branched linear ethylene polymers can be prepared via the solution, slurry or gas phase polymerization of ethylene and one or more optional α-olefin comonomers in the presence of a Ziegler Nana catalyst, by processes such as are disclosed in U.S. Pat. No. 4,076,698 (Anderson, et al.).

Overall, the high crystallinity, ethylene-based polymers have a density of greater than or equal to about 0859 g/cm³, preferably greater than or equal to about 0.91 g/cm³, and preferably less than or equal to about 0.97 g/cm³. All densities are determined by the Density method as described in the Test Methods section.

Highly Long Chain Branched Ethylene-Based Polymers

Highly long chain branched ethylene-based polymers, such as low density polyethylene (LDPE), can be made using a high-pressure process using free-radical chemistry to polymerize ethylene monomer. Typical polymer density is from about 0.91 to about 0.94 g/cm³. The low density polyethylene may have a melt index ($I_2$) from about 0.01 to about 150 g/10 minutes. Highly long chain branched ethylene-based polymers such as LDPE may also be referred to as "high pressure ethylene polymers", meaning that the polymer is partly or entirely homopolymerized or copolymerized in autoclave or tubular reactors at pressures above 13,000 psig with the use of free-radical initiators, such as peroxides (see, for example, U.S. Pat. No. 4,599,392 (McKinney, et al.)). The process creates a polymer with significant branches, including long chain branches.

Highly long chain branched ethylene-based polymers are typically homopolymers of ethylene; however, the polymer may comprise units derived from one or more α-olefin copolymers as long as there is at least 50 mole percent polymerized ethylene monomer in the polymer.

Comonomers that may be used in forming highly branched ethylene-based polymer include, but are not limited to, α-olefin comonomers, typically having no more than 20 carbon atoms. For example, the α-olefin comonomers, for example, may have 3 to 10 carbon atoms; or in the alternative, the α-olefin comonomers, for example, may have 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. In the alternative, exemplary comonomers include, but are not limited to α, β-unsaturated $C_3$-$C_8$-carboxylic acids, in particular maleic acid, fumaric acid, itaconic acid, acrylic acid, methacrylic acid and crotonic acid derivates of the α, β-unsaturated $C_3$-$C_8$-carboxylic acids, for example unsaturated $C_3$-$C_{15}$-carboxylic acid esters, in particular ester of $C_1$-$C_6$-alkanols, or anhydrides, in particular methyl methacrylate, ethyl methacrylate, n-butyl methacrylate, ter-butyl methacrylate, methyl acrylate, ethyl acrylate n-butyl acrylate, 2-ethylhexyl acrylate, tert-butyl acrylate, methacrylic anhydride, maleic anhydride, and itaconic anhydride. In another alternative, the exemplary comonomers include, but are not limited to, vinyl carboxylates, for example vinyl acetate. In another alternative, exemplary comonomers include, but are not limited to, n-butyl acrylate, acrylic acid and methacrylic acid.

Process

The crystalline ethylene-based polymer may be produced before or separately from the reaction process with the highly branched ethylene-based polymer. In other disclosed processes, the crystalline ethylene-based polymer may be formed in situ and in the presence of highly branched ethylene-based polymer within a well-stirred reactor such as a tubular reactor or an autoclave reactor. The highly long chain branched ethylene-based polymer is formed in the presence of ethylene.

In one process, the crystalline ethylene-based polymer is prepared externally to the reaction process used to form the ethylenic polymer, combined in a common reactor in the presence of ethylene under free-radical polymerization conditions, and subjected to process conditions and reactants to effect the formation of the ethylenic polymer.

In another process, the highly long chain branched ethylene-based polymer and the crystalline ethylene-based polymer are both prepared in different forward parts of the same process and are then combined together in a common downstream part of the process in the presence of ethylene under free-radical polymerization conditions. The crystalline ethylene-based polymer and the substituent highly long chain branched ethylene-based polymer are made in separate forward reaction areas or zones, such as separate autoclaves or an upstream part of a tubular reactor. The products from these forward reaction areas or zones are then transported to and combined in a downstream reaction area or zone in the presence of ethylene under free-radical polymerization conditions to facilitate the formation of an embodiment ethylenic polymer. In some processes, additional fresh ethylene is added to the process downstream of the forward reaction areas or zones to facilitate both the formation of and grafting of highly long chain branched ethylene-based polymers to the crystalline ethylene-based polymer and the reaction of ethylene monomer directly with the crystalline ethylene-based polymer to form the disclosed ethylenic polymer. In some other processes, at least one of the product streams from the forward reaction areas or zones is treated before reaching the downstream reaction area or zone to neutralize any residue or byproducts that may inhibit the downstream reactions.

In an embodiment in situ process, the crystalline ethylene-based polymer is created in a first or forward reaction area or zone, such as a first autoclave or an upstream part of a tubular reactor. The resultant product stream is then transported to a downstream reaction area or zone where there is a presence of ethylene at free-radical polymerization conditions. These conditions support both the formation of and grafting of highly long chain branched ethylene-based polymer to the crystalline ethylene-based polymer, thereby forming an ethylenic polymer. In some processes, free radical generating compounds are added to the downstream reaction area or zone to facilitate the grafting reaction. In some other processes, additional fresh ethylene is added to the process downstream of the forward reaction areas or zones to facilitate both the formation and grafting of highly long chain branched ethylene-based polymer to and the reaction of ethylene monomer with the crystalline ethylene-based polymer to form the disclosed ethylenic polymer. In some processes, the product stream from the forward reaction area or zone is treated before reaching the downstream reaction area or zone to neutralize any residue or byproducts from the previous reaction that may inhibit the highly branched ethylene-based polymer formation, the grafting of highly long chain branched ethylene-based polymer to the crystalline ethylene-based polymer, or the reaction of ethylene monomer with the crystalline ethylene-based polymer to form the disclosed ethylenic polymer.

In another embodiment of the in situ process, the crystalline ethylene-based polymer is created in the same reaction area or zone as the highly long chain branched ethylene-based polymer under conditions which support the production of both the crystalline ethylene-based polymer, the highly long chain branched ethylene-based polymer and the grafting of the two polymer types. In some processes, free radical generating compounds and crystalline polyethylene catalysts can be added to the same reaction zone with fresh ethylene to produce the disclosed ethylene polymer. In some other processes an additional substance can be added to the reactor zone to prevent any residues or byproducts from affecting either the free radical forming species or the crystalline polyethylene catalyst.

For producing the crystalline ethylene-based polymer, a gas-phase polymerization process may be used. The gas-phase polymerization reaction typically occurs at low pressures with gaseous ethylene, hydrogen, a catalyst system, for example a titanium containing catalyst, and, optionally, one or more comonomers, continuously fed to a fluidized-bed reactor. Such a system typically operates at a pressure from about 300 to about 350 psi and a temperature from about 80 to about 100° C.

For producing the crystalline ethylene-based polymer, a solution-phase polymerization process may be used. Typically such a process occurs in a well-stirred reactor such as a loop reactor or a sphere reactor at temperature from about 150 to about 575° C., preferably from about 175 to about 205° C., and at pressures from about 30 to about 1000 psi, preferably from about 30 to about 750 psi. The residence time in such a process is from about 2 to about 20 minutes, preferably from about 10 to about 20 minutes. Ethylene, solvent, catalyst, and optionally one or more comonomers are fed continuously to the reactor. Exemplary catalysts in these embodiments include, but are not limited to, Ziegler-Natta, constrained geometry, and metallocene catalysts. Exemplary solvents include, but are not limited to, isoparaffins. For example, such solvents are commercially available under the name ISOPAR E (ExxonMobil Chemical Co., Houston, Tex.). The resultant mixture of ethylene-based polymer and solvent is then removed from the reactor and the polymer is isolated. Solvent is typically recovered via a solvent recovery unit, that is, heat exchangers and vapor liquid separator drum, and is recycled back into the polymerization system.

Any suitable method may be used for feeding the crystalline ethylene-based polymer into a reactor where it may be reacted with a highly long chain branched ethylene-based polymer. For example, in the cases where the crystalline ethylene-based polymer is produced using a gas phase process, the crystalline ethylene-based polymer may be dissolved in ethylene at a pressure above the highly long chain branched ethylene-based polymer reactor pressure, at a temperature at least high enough to dissolve the crystalline ethylene-based polymer and at concentration which does not lead to excessive viscosity before feeding to the highly long chain branched ethylene-based polymer reactor.

For producing the crystalline ethylene-based polymer, a high pressure, free-radical initiated polymerization process can be used. Two different high pressure free-radical initiated polymerization process types are known. In the first type, an agitated autoclave vessel having one or more reaction zones is used. In the second type, a jacketed tube is used as a reactor, which has one or more reaction zones. Suitable, but not limiting, reactor lengths may be from about 100 to about 3000 meters, preferably from about 1000 to about 2000 meters. The beginning of a reaction zone for either type of reactor is defined by the side injection of either initiator of the reaction, ethylene, telomer, comonomer(s) as well as any combination thereof. A high pressure process can be carried out in autoclave or tubular reactors or in a combination of autoclave and tubular reactors, each comprising one or more reaction zones.

For producing the highly long chain branched ethylene-based polymer, a high pressure, free-radical initiated polymerization process is typically used. Two different high pressure free-radical initiated polymerization process types are known. In the first type, an agitated autoclave vessel having one or more reaction zones is used. In the second type, a jacketed tube is used as a reactor, which has one or more reaction zones. Suitable, but not limiting, reactor lengths may be from about 100 to about 3000 meters, preferably from about 1000 to about 2000 meters. The beginning of a reaction zone for either type of reactor is defined by the side injection of either initiator of the reaction, ethylene, telomer, comonomer(s) as well as any combination thereof. A high pressure process can be carried out in autoclave or tubular reactors or in a combination of autoclave and tubular reactors, each comprising one or more reaction zones.

Some processes may be used for either the homopolymerization of ethylene in the presence of an ethylene-based polymer or copolymerization of ethylene with one or more other comonomers in the presence of an ethylene-based polymer, provided that these monomers are copolymerizable with ethylene under free-radical conditions in high pressure conditions to form highly long chain branched ethylene-based polymers.

Chain transfer agents or telogens (CTA) are typically used to control the melt index in a free-radical polymerization process. For high pressure free radical polymerizaton, these CTAs can be of many different types, such as saturated hydrocarbons, unsaturated hydrocarbons, aldehydes, ketones or alcohols. Typical CTAs that can be used include, but are not limited to, propylene, isobutane, n-butane, 1-butene, methyl ethyl ketone, propionaldehyde, ISOPAR (ExxonMobil Chemical Co.), and isopropanol. The amount of CTAs to use in the process is about 0.03 to about 10 weight percent of the total reaction mixture.

Free radical initiators that are generally used to produce ethylene-based polymers are oxygen, which is usable in tubular reactors in conventional amounts of between 0.0001 and 0.005 wt. % drawn to the weight of polymerizable monomer, and peroxides. Preferred initiators are t-butyl peroxy pivalate, di-t-butyl peroxide, t-butyl peroxy acetate and t-butyl peroxy-2-hexanoate or mixtures thereof. These organic peroxy initiators are used in conventional amounts of between 0.005 and 0.2 wt. % drawn to the weight of polymerizable monomers.

The peroxide initiator may be, for example, an organic peroxide. Exemplary organic peroxides include, but are not limited to, cyclic peroxides, diacyl peroxides, dialkyl peroxides, hydroperoxides, peroxycarbonates, peroxydicarbonates, peroxyesters, and peroxyketals.

Exemplary cyclic peroxides include, but are not limited to, 3,6,9-triethyl-3,6,9-trimethyl-1,4,7-triperoxonane. Such cyclic peroxides, for example, are commercially available under the tradename TRIGONOX 301 (Akzo Nobel; Arnhem, The Netherlands). Exemplary diacyl peroxides include, but are not limited to, di(3,5,5-trimethylhexanoyl)peroxide. Such diacyl peroxides, for example, are commercially available under the tradename TRIGONOX 36 (Akzo Nobel). Exemplary dialkyl peroxides include, but are not limited to, 2,5-dimethyl-2,5-di(tert-butylperoxy)hexane; 2,5-dimethyl-2,5-di(tert-butylperoxy)hexyne-3; di-tert-amyl peroxide; di-tert-butyl peroxide; and tert-butyl cumyl peroxide. Such dialkyl peroxides, for example, are commercially available under the tradenames TRIGONOX 101, TRIGONOX 145, TRIGONOX 201, TRIGONOX B, and TRIGONOX T (Akzo Nobel). Exemplary hydroperoxides include, but are not limited to, tert-Amyl hydroperoxide; and 1,1,3,3-tetramethylbutyl hydroperoxide. Such hydroperoxides, for example, are commercially available under the tradenames TRIGONOX TAHP, and TRIGONOX TMBH (Akzo Nobel). Exemplary peroxycarbonates include, but are not limited to, tert-butylperoxy 2-ethylhexyl carbonate; tert-amylperoxy 2-ethylhexyl carbonate; and tert-butylperoxy isopropyl carbonate. Such peroxycarbonates, for example, are commercially available under the tradenames TRIGONOX 117, TRIGONOX 131, and TRIGONOX BPIC (Akzo Nobel). Exemplary peroxydicarbonates include, but are not limited to, di(2-ethylhexyl) peroxydicarbonates; and di-sec-butyl peroxydicarbonates. Such peroxydicarbonates, for example, are commercially available under the tradename TRIGONOX EHP, and TRIGONOX SBP (Akzo Nobel). Exemplary peroxyesters include, but are not limited to, tert-amyl peroxy-2-ethylhexanoate; tert-amyl peroxyneodecanoate; tert-amyl peroxypivalate; tert-amyl peroxybenzoate; tert-amyl peroxyacetate; 2,5-dimethyl-2,5-di(2-ethylhexanoylperoxy)hexane; tert-butyl peroxy-2-ethylhexanoate; tert-butyl peroxyneodecanoate; tert-butyl peroxyneoheptanoate; tert-butyl peroxypivalate; tert-butyl peroxydiethylacetate; tert-butyl peroxyisobutyrate; 1,1,3,3-tetramethylbutyl peroxy-2-ethylhexanoate; 1,1,3,3-tetramethylbutyl peroxyneodecanoate; 1,1,3,3-tetramethylbutyl peroxypivalate; tert-butyl peroxy-3,5,5-trimethylhexanoate; cumyl peroxyneodecanoate; tert-butyl peroxybenzoate; and tert-butyl peroxyacetate. Such peroxyesters solvents, for example, are commercially available under the tradenames TRIGONOX 121; TRIGONOX 123; TRIGONOX 125; TRIGONOX 127; TRIGONOX 133; TRIGONOX 141; TRIGONOX 21; TRIGONOX 23; TRIGONOX 257; TRIGONOX 25; TRIGONOX 27; TRIGONOX 41; TRIGONOX 421; TRIGONOX 423; TRIGONOX 425; TRIGONOX 42; TRIGONOX 99; TRIGONOX C; and TRIGONOX F (Akzo Nobel). Exemplary peroxyketals include, but are not limited to, 1,1-di(tert-amylperoxy)cyclohexane; 1,1-di(tert-butylperoxy)cyclohexane; 1,1-di(tert-butylperoxy)-3,3,5-trimethylcyclohexane; and 2,2-di(tert-butylperoxy)butane. Such peroxyketals, for example, are commercially available under the tradenames TRIGONOX 122, TRIGONOX 22, TRIGONOX 29, and TRIGONOX D (Akzo Nobel). The free radical initiator system may, for example, include a mixture or combination of any of the aforementioned peroxide initiators. The peroxide initiator may comprise less than 60 percent by weight the free radical initiator system.

The free radical initiator system further includes at least one hydrocarbon solvent. The hydrocarbon solvent may, for example, be a $C_5$ to $C_{30}$ hydrocarbon solvent. Exemplary hydrocarbon solvents include, but are not limited to, mineral solvents, normal paraffinic solvents, isoparaffinic solvents, cyclic solvents, and the like. The hydrocarbon solvents may, for example, be selected from the group consisting of n-octane, iso-octane (2,2,4-trimethylpentane), n-dodecane, iso-dodecane (2,2,4,6,6-pentamethylheptane), and other isoparaffinic solvents. Exemplary hydrocarbon solvents such as isoparaffinic solvents, for example, are commercially available under the tradenames ISOPAR C, ISOPAR E, and ISO- PAR H (ExxonMobil Chemical Co.). The hydrocarbon solvent may comprise less than 99 percent by weight of the free radical initiator system.

In some processes, the free radical initiator system may further include a polar co-solvent. The polar co-solvent may be an alcohol co-solvent, for example, a $C_1$ to $C_{30}$ alcohol. Additionally, the alcohol functionality of the alcohol co-solvent may, for example, be mono-functional or multi-functional. Exemplary alcohols as a polar co-solvent include, but are not limited to, isopropanol (2-propanol), allylalcohol (1-pentanol), methanol, ethanol, propanol, butanol, 1,4-butanediol, combinations thereof, mixtures thereof, and the like. The polar co-solvent may comprise less than 40 percent by weight of the free radical initiator system.

The polar co-solvent may be an aldehyde, for example, propionaldehyde. However, the reactivity potential of aldehydes as chain transfer agents should be taken into account when using such aldehydes as polar co-solvents.

The polar co-solvent may be a ketone, such as acetone or tetrahydrofuran. However, the reactivity potential of ketones as chain transfer agents should be taken into account when using such ketones as polar co-solvents.

In some processes, the free radical initiator system may further comprise a chain transfer agent as a solvent or as a blend for simultaneous injection. As previously discussed, chain transfer agents include, but are not limited to, propane, isobutane, acetone, propylene, isopropanol, butene-1, propionaldehyde, and methyl ethyl ketone. In other disclosed processes, chain transfer agent may be charged into the reactor via a separate inlet port from the initiator system. In another process, a chain transfer agent may be blended with ethylene, pressurized, and then injected into the reactor in its own injection system.

In some processes, a peroxide initiator may initially be dissolved or diluted in a hydrocarbon solvent, and then a polar co-solvent added to the peroxide initiator/hydrocarbon solvent mixture prior to metering the free radical initiator system into the polymerization reactor. In another process, a peroxide initiator may be dissolved in the hydrocarbon solvent in the presence of a polar co-solvent.

The free-radical initiator used in the process may initiate the graft site on the crystalline ethylene-based polymer by extracting the extractable hydrogen from the crystalline ethylene-based polymer. Example free-radical initiators include those free radical initiators previously discussed, such as peroxides and azo compounds. In some other embodiment processes, ionizing radiation may also be used to free the extractable hydrogen and create the radicalized site on the linear ethylene-based polymer. Organic initiators are preferred means of extracting the extractable hydrogen, such as using dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butyl peroxy)hexane, lauryl peroxide, and tert-butyl peracetate, t-butyl α-cumyl peroxide, di-t-butyl peroxide, di-t-amyl peroxide, t-amyl peroxybenzoate, 1,1-bis(t-butylperoxy)-3,3,5-trimethylcyclohexane, α,α'-bis(t-butylperoxy)-1,3-diisopropylbenzene, α,α'-bis(t-butylperoxy)-1,4-diisopropylbenzene, 2,5-bis(t-butylperoxy)-2,5-dimethylhexane, and 2,5-bis(t-butylperoxy)-2,5-dimethyl-3-hexyne. A preferred azo compound is azobisisobutyl nitrite.

Suitable catalysts for use in some processes include any compound or combination of compounds that is adapted for preparing polymers of the desired composition or type, either the crystalline ethylene-based polymers or the highly long chain branched ethylene-based polymers. Both heterogeneous and homogeneous catalysts, and combinations thereof, may be employed with the preferred catalysts of the invention. In some processes, heterogeneous catalysts, including the well known Ziegler-Natta compositions, especially Group 4 metal halides supported on Group 2 metal halides or mixed halides and alkoxides and the well known chromium or vanadium based catalysts, may be used. In some processes, the catalysts for use may be homogeneous catalysts comprising a relatively pure organometallic compound or metal complex, especially compounds or complexes based on metals selected from Groups 3-10 or the Lanthanide series. If more than one catalyst is used in a system, it is preferred that any catalyst employed not significantly detrimentally affect the performance of another catalyst under the conditions of polymerization. Desirably, no catalyst is reduced in activity by greater than 25 percent, more preferably greater than 10 percent under the conditions of the polymerization. Examples of catalyst systems may be found in U.S. Pat. No. 5,272,236 (Lai, et al.); U.S. Pat. No. 5,278,272 (Lai, et al.); U.S. Pat. No. 6,054,544 (Finlayson, et al.); U.S. Pat. No. 6,335,410 (Finlayson, et al.); and U.S. Pat. No. 6,723,810 (Finlayson, et al.); PCT Publication Nos. WO 2003/091262 (Boussie, et al.); 2007/136497 (Konze, et al.); 2007/136506 (Konze, et al.); 2007/136495 (Konze, et al.); and 2007/136496 (Aboelella, et al.). Other catalysts may be found in U.S. Patent Publication No. 2007/0167578 (Arriola, et al.).

Preferred catalysts for use in the processes of the invention include those described in WO 2007/136496, WO 2007/136495, WO 2007/136497, WO 2007/136506, WO 2006/020624, and WO 2007/075299.

In processes employing a complex metal catalyst, such a catalyst may be activated to form an active catalyst composition by combination with a cocatalyst, preferably a cation forming cocatalyst, a strong Lewis acid, or a combination thereof. Suitable cocatalysts for use include polymeric or oligomeric aluminoxanes, especially methyl aluminoxane, as well as inert, compatible, noncoordinating, ion forming compounds. So-called modified methyl aluminoxane (MMAO) is also suitable for use as a cocatalyst. One technique for preparing such modified aluminoxane is disclosed in U.S. Pat. No. 5,041,584 (Crapo, et al.). Aluminoxanes can also be made as disclosed in U.S. Pat. No. 5,542,199 (Lai, et al.); U.S. Pat. No. 4,544,762 (Kaminsky, et al.); U.S. Pat. No. 5,015,749 (Schmidt, et al.); and U.S. Pat. No. 5,041,585 (Deavenport, et al.). Other preferred cocatalysts are inert, noncoordinating, boron compounds, such as perfluoroarylborane $(B(C_6F_5)_3)$ and the class of compounds known as (bis-hydrogenated tallowalkyl)methylammonium tetrakis(pentafluorophenyl)borates, which are mixtures of complexes with the general chemical structure $([R_2NCH_3]+[B(C_6F_5)_4]—$, wherein R may be a $C_{14}$, $C_{16}$ or $C_{18}$ alkyl. Other preferred cocatalysts may be found in U.S. Patent Publication No. 2007/0167578.

In some processes, processing aids, such as plasticizers, can also be included in the ethylenic polymer product. These aids include, but are not limited to, the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils useful as processing aids include white mineral oil such as KAYDOL oil (Chemtura Corp.; Middlebury, Conn.) and SHELLFLEX 371 naphthenic oil (Shell Lubricants; Houston, Tex.). Another suitable oil is TUFFLO oil (Lyondell Lubricants; Houston, Tex).

In some processes, ethylenic polymers are treated with one or more stabilizers, for example, antioxidants, such as IRGANOX 1010 and IRGAFOS 168 (Ciba Specialty Chemicals;

Glattbrugg, Switzerland). In general, polymers are treated with one or more stabilizers before an extrusion or other melt processes. In other embodiment processes, other polymeric additives include, but are not limited to, ultraviolet light absorbers, antistatic agents, pigments, dyes, nucleating agents, fillers, slip agents, fire retardants, plasticizers, processing aids, lubricants, stabilizers, smoke inhibitors, viscosity control agents and anti-blocking agents. The ethylenic polymer composition may, for example, comprise less than 10 percent by the combined weight of one or more additives, based on the weight of the embodiment ethylenic polymer.

The ethylenic polymer produced may further be compounded. In some ethylenic polymer compositions, one or more antioxidants may further be compounded into the polymer and the compounded polymer pelletized. The compounded ethylenic polymer may contain any amount of one or more antioxidants. For example, the compounded ethylenic polymer may comprise from about 200 to about 600 parts of one or more phenolic antioxidants per one million parts of the polymer. In addition, the compounded ethylenic polymer may comprise from about 800 to about 1200 parts of a phosphite-based antioxidant per one million parts of polymer. The compounded disclosed ethylenic polymer may further comprise from about 300 to about 1250 parts of calcium stearate per one million parts of polymer.

Uses

The ethylenic polymer may be employed in a variety of conventional thermoplastic fabrication processes to produce useful articles, including objects comprising at least one film layer, such as a monolayer film, or at least one layer in a multilayer film prepared by cast, blown, calendered, or extrusion coating processes; molded articles, such as blow molded, injection molded, or rotomolded articles; extrusions; fibers; and woven or non-woven fabrics. Thermoplastic compositions comprising the ethylenic polymer include blends with other natural or synthetic materials, polymers, additives, reinforcing agents, ignition resistant additives, antioxidants, stabilizers, colorants, extenders, crosslinkers, blowing agents, and plasticizers.

The ethylenic polymer may be used in producing fibers for other applications. Fibers that may be prepared from the ethylenic polymer or blends thereof include staple fibers, tow, multicomponent, sheath/core, twisted, and monofilament. Suitable fiber forming processes include spunbonded and melt blown techniques, as disclosed in U.S. Pat. No. 4,340, 563 (Appel, et al.), U.S. Pat. No. 4,663,220 (Wisneski, et al.), U.S. Pat. No. 4,668,566 (Nohr, et al.), and U.S. Pat. No. 4,322,027 (Reba), gel spun fibers as disclosed in U.S. Pat. No. 4,413,110 (Kavesh, et al.), woven and nonwoven fabrics, as disclosed in U.S. Pat. No. 3,485,706 (May), or structures made from such fibers, including blends with other fibers, such as polyester, nylon or cotton, thermoformed articles, extruded shapes, including profile extrusions and co-extrusions, calendared articles, and drawn, twisted, or crimped yarns or fibers.

Additives and adjuvants may be added to the ethylenic polymer post-formation. Suitable additives include fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils; and other natural and synthetic polymers, including other polymers that are or can be made according to the embodiment methods.

Blends and mixtures of the ethylenic polymer with other polyolefins may be performed. Suitable polymers for blending with the embodiment ethylenic polymer include thermoplastic and non-thermoplastic polymers including natural and synthetic polymers. Exemplary polymers for blending include polypropylene, (both impact modifying polypropylene, isotactic polypropylene, atactic polypropylene, and random ethylene/propylene copolymers), various types of polyethylene, including high pressure, free-radical LDPE, Ziegler-Natta LLDPE, metallocene PE, including multiple reactor PE ("in reactor" blends of Ziegler-Natta PE and metallocene PE, such as products disclosed in U.S. Pat. No. 6,545,088 (Kolthammer, et al.); U.S. Pat. No. 6,538,070 (Cardwell, et al.); U.S. Pat. No. 6,566,446 (Parikh, et al.); U.S. Pat. No. 5,844,045 (Kolthammer, et al.); U.S. Pat. No. 5,869,575 (Kolthammer, et al.); and U.S. Pat. No. 6,448,341 (Kolthammer, et al.)), ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Homogeneous polymers such as olefin plastomers and elastomers, ethylene and propylene-based copolymers (for example, polymers available under the trade designation VERSIFY™ Plastomers & Elastomers (The Dow Chemical Company), SURPASS™ (Nova Chemicals), and VISTAMAXX™ (ExxonMobil Chemical Co.)) can also be useful as components in blends comprising the ethylenic polymer.

Definitions

The term "composition," as used, includes a mixture of materials which comprise the composition, as well as reaction products and decomposition products formed from the materials of the composition.

The terms "blend" or "polymer blend," as used, mean an intimate physical mixture (that is, without reaction) of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The term "linear" refers to polymers where the polymer backbone of the polymer lacks measurable or demonstrable long chain branches, for example, the polymer can be substituted with an average of less than 0.01 long branch per 1000 carbons.

The term "polymer" refers to a polymeric compound prepared by polymerizing monomers, whether of the same or a different type. The generic term polymer thus embraces the term "homopolymer," usually employed to refer to polymers prepared from only one type of monomer, and the term "interpolymer" as defined. The terms "ethylene/α-olefin polymer" is indicative of interpolymers as described.

The term "interpolymer" refers to polymers prepared by the polymerization of at least two different types of monomers. The generic term interpolymer includes copolymers, usually employed to refer to polymers prepared from two different monomers, and polymers prepared from more than two different types of monomers.

The term "ethylene-based polymer" refers to a polymer that contains more than 50 mole percent polymerized ethylene monomer (based on the total amount of polymerizable monomers) and, optionally, may contain at least one comonomer.

The term "ethylene/α-olefin interpolymer" refers to an interpolymer that contains more than 50 mole percent polymerized ethylene monomer (based on the total amount of polymerizable monomers) and at least one α-olefin.

The term "ethylenic polymer" refers to a polymer resulting from the intermolecular bonding of a crystalline ethylene-based polymer and at least one highly long chain branched ethylene-based polymer.

Test Methods

Density

Samples that are measured for density are prepared according to ASTM D 1928. Measurements are made within one hour of sample pressing using ASTM D792, Method B.

For some highly long chain branched ethylene-based polymers, density is calculated ("calculated density") in grams per cubic centimeter based upon a relationship with the heat of fusion ($H_f$) in Joules per gram of the sample. The heat of fusion of the polymer sample is determined using the DSC Crystallinity method described infra.

Melt Index

Melt index, or $I_2$, is measured in accordance with ASTM D 1238, Condition 190° C./2.16 kg, and is reported in grams eluted per 10 minutes. $I_{10}$ is measured in accordance with ASTM D 1238, Condition 190° C./10 kg, and is reported in grams eluted per 10 minutes.

DSC Crystallinity

Differential Scanning Calorimetry (DSC) can be used to measure the melting and crystallization behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (~25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are peak melting temperature ($T_m$), peak crystallization temperature ($T_c$), heat of fusion ($H_f$) (in Joules per gram), and the calculated % crystallinity for polyethylene samples using Equation 2:

% Crystallinity=(($H_f$)/(292 J/g))×100    (Eq. 2).

The heat of fusion ($H_f$) and the peak melting temperature are reported from the second heat curve. Peak crystallization temperature is determined from the cooling curve.

Gel Permeation Chromatography (GPC)

The GPC system consists of a Waters (Milford, Mass.) 150 C high temperature chromatograph (other suitable high temperatures GPC instruments include Polymer Laboratories (Shropshire, UK) Model 210 and Model 220) equipped with an on-board differential refractometer (RI). Additional detectors can include an IR4 infra-red detector from Polymer ChAR (Valencia, Spain), Precision Detectors (Amherst, Mass.) 2-angle laser light scattering detector Model 2040, and a Viscotek (Houston, Tex.) 150R 4-capillary solution viscometer. A GPC with the last two independent detectors and at least one of the first detectors is sometimes referred to as "3D-GPC", while the term "GPC" alone generally refers to conventional GPC. Depending on the sample, either the 15-degree angle or the 90-degree angle of the light scattering detector is used for calculation purposes. Data collection is performed using Viscotek TriSEC software, Version 3, and a 4-channel Viscotek Data Manager DM400. The system is also equipped with an on-line solvent degassing device from Polymer Laboratories (Shropshire, UK). Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of butylated hydroxytoluene (BHT). Both solvents are sparged with nitrogen. The polyethylene samples are gently stirred at 160° C. for four hours. The injection volume is 200 microliters. The flow rate through the GPC is set at 1 ml/minute.

The GPC column set is calibrated before running the Examples by running twenty-one narrow molecular weight distribution polystyrene standards. The molecular weight (MW) of the standards ranges from 580 to 8,400,000 grams per mole, and the standards are contained in 6 "cocktail" mixtures. Each standard mixture has at least a decade of separation between individual molecular weights. The standard mixtures are purchased from Polymer Laboratories (Shropshire, UK). The polystyrene standards are prepared at 0.025 g in 50 mL of solvent for molecular weights equal to or greater than 1,000,000 grams per mole and 0.05 g in 50 ml of solvent for molecular weights less than 1,000,000 grams per mole. The polystyrene standards were dissolved at 80° C. with gentle agitation for 30 minutes. The narrow standards mixtures are run first and in order of decreasing highest molecular weight component to minimize degradation. The polystyrene standard peak molecular weights are converted to polyethylene $M_w$ using the Mark-Houwink K and a (sometimes referred to as a) values mentioned later for polystyrene and polyethylene. See the Examples section for a demonstration of this procedure.

With 3D-GPC absolute weight average molecular weight ("$M_{w, Abs}$") and intrinsic viscosity are also obtained independently from suitable narrow polyethylene standards using the same conditions mentioned previously. These narrow linear polyethylene standards may be obtained from Polymer Laboratories (Shropshire, UK; Part No.'s PL2650-0101 and PL2650-0102).

The systematic approach for the determination of multi-detector offsets is performed in a manner consistent with that published by Balke, Mourey, et al. (Mourey and Balke, *Chromatography Polym.*, Chapter 12, (1992)) (Balke, Thitiratsakul, Lew, Cheung, Mourey, *Chromatography Polym.*, Chapter 13, (1992)), optimizing triple detector log ($M_W$ and intrinsic viscosity) results from Dow 1683 broad polystyrene (American Polymer Standards Corp.; Mentor, Ohio) or its equivalent to the narrow standard column calibration results from the narrow polystyrene standards calibration curve. The molecular weight data, accounting for detector volume offset determination, are obtained in a manner consistent with that published by Zimm (Zimm, B. H., *J. Chem. Phys.*, 16, 1099 (1948)) and Kratochvil (Kratochvil, P., *Classical Light*

Scattering from Polymer Solutions, Elsevier, Oxford, N.Y. (1987)). The overall injected concentration used in the determination of the molecular weight is obtained from the mass detector area and the mass detector constant derived from a suitable linear polyethylene homopolymer, or one of the polyethylene standards. The calculated molecular weights are obtained using a light scattering constant derived from one or more of the polyethylene standards mentioned and a refractive index concentration coefficient, do/dc, of 0.104. Generally, the mass detector response and the light scattering constant should be determined from a linear standard with a molecular weight in excess of about 50,000 daltons. The viscometer calibration can be accomplished using the methods described by the manufacturer or alternatively by using the published values of suitable linear standards such as Standard Reference Materials (SRM) 1475a, 1482a, 1483, or 1484a. The chromatographic concentrations are assumed low enough to eliminate addressing $2^{nd}$ viral coefficient effects (concentration effects on molecular weight).

g' by 3D-GPC

The index (g') for the sample polymer is determined by first calibrating the light scattering, viscosity, and concentration detectors described in the Gel Permeation Chromatography method supra with SRM 1475a homopolymer polyethylene (or an equivalent reference). The light scattering and viscometer detector offsets are determined relative to the concentration detector as described in the calibration. Baselines are subtracted from the light scattering, viscometer, and concentration chromatograms and integration windows are then set making certain to integrate all of the low molecular weight retention volume range in the light scattering and viscometer chromatograms that indicate the presence of detectable polymer from the refractive index chromatogram. A linear homopolymer polyethylene is used to establish a Mark-Houwink (MH) linear reference line by injecting a broad molecular weight polyethylene reference such as SRM1475a standard, calculating the data file, and recording the intrinsic viscosity (IV) and molecular weight ($M_W$), each derived from the light scattering and viscosity detectors respectively and the concentration as determined from the RI detector mass constant for each chromatographic slice. For the analysis of samples the procedure for each chromatographic slice is repeated to obtain a sample Mark-Houwink line. Note that for some samples the lower molecular weights, the intrinsic viscosity and the molecular weight data may need to be extrapolated such that the measured molecular weight and intrinsic viscosity asymptotically approach a linear homopolymer GPC calibration curve. To this end, many highly-branched ethylene-based polymer samples require that the linear reference line be shifted slightly to account for the contribution of short chain branching before proceeding with the long chain branching index (g') calculation.

A g-prime ($g_i'$) is calculated for each branched sample chromatographic slice (i) and measuring molecular weight ($M_i$) according to Equation 5:

$$g_i' = (IV_{Sample,i}/IV_{linear\_reference,j}) \quad \text{(Eq. 5)},$$

where the calculation utilizes the $IV_{linear\_reference,j}$ at equivalent molecular weight, $M_j$, in the linear reference sample. In other words, the sample IV slice (i) and reference IV slice (j) have the same molecular weight ($M_i = M$). For simplicity, the $W_{linear\_reference,j}$ slices are calculated from a fifth-order polynomial fit of the reference Mark-Houwink Plot. The IV ratio, or $g_i'$, is only obtained at molecular weights greater than 3,500 because of signal-to-noise limitations in the light scattering data. The number of branches along the sample polymer ($B_n$) at each data slice (i) can be determined by using Equation 6, assuming a viscosity shielding epsilon factor of 0.75:

$$\left[\frac{IV_{Sample,i}}{IV_{linear\_reference,j}}\right]^{1.33}_{M_i=j} = \left[\left(1+\frac{B_{n,i}}{7}\right)^{1/2} + \frac{4}{9}\frac{B_{n,i}}{\pi}\right]^{-1/2}. \quad \text{(Eq. 6)}$$

Finally, the average LCBf quantity per 1000 carbons in the polymer across all of the slices (i) can be determined using Equation 7:

$$LCBf = \frac{\sum_{M=3500}^{i}\left(\frac{B_{n,i}}{M_i/14000}c_i\right)}{\sum c_i}. \quad \text{(Eq. 7)}$$

gpcBR Branching Index by 3D-GPC

In the 3D-GPC configuration the polyethylene and polystyrene standards can be used to measure the Mark-Houwink constants, K and α, independently for each of the two polymer types, polystyrene and polyethylene. These can be used to refine the Williams and Ward polyethylene equivalent molecular weights in application of the following methods.

The gpcBR branching index is determined by first calibrating the light scattering, viscosity, and concentration detectors as described previously. Baselines are then subtracted from the light scattering, viscometer, and concentration chromatograms. Integration windows are then set to ensure integration of all of the low molecular weight retention volume range in the light scattering and viscometer chromatograms that indicate the presence of detectable polymer from the refractive index chromatogram. Linear polyethylene standards are then used to establish polyethylene and polystyrene Mark-Houwink constants as described previously. Upon obtaining the constants, the two values are used to construct two linear reference conventional calibrations ("cc") for polyethylene molecular weight and polyethylene intrinsic viscosity as a function of elution volume, as shown in Equations 8 and 9:

$$M_{PE} = \left(\frac{K_{PS}}{K_{PE}}\right)^{1/\alpha_{PE}+1} \cdot M_{PS}^{\alpha_{PS}+1/\alpha_{PE}+1}, \quad \text{(Eq. 8)}$$

and $$[\eta]_{PE} = K_{PS} \cdot M_{PS}^{\alpha+1}/M_{PE}. \quad \text{(Eq. 9)}$$

The gpcBR branching index is a robust method for the characterization of long chain branching. See Yau, Wallace W., "Examples of Using 3D-GPC—TREF for Polyolefin Characterization", *Macromol. Symp.*, 2007, 257, 29-45. The index avoids the slice-by-slice 3D-GPC calculations traditionally used in the determination of g' values and branching frequency calculations in favor of whole polymer detector areas and area dot products. From 3D-GPC data, one can obtain the sample bulk $M_w$ by the light scattering (LS) detector using the peak area method. The method avoids the slice-by-slice ratio of light scattering detector signal over the concentration detector signal as required in the g' determination.

$$M_W = \sum_i w_i M_i \quad \text{(Eq. 10)}$$

-continued $$= \sum_i \left(\frac{C_i}{\sum_i C_i}\right) M_i$$

$$= \frac{\sum_i C_i M_i}{\sum_i C_i}$$

$$= \frac{\sum_i LS_i}{\sum_i C_i}$$

$$= \frac{LS \text{ Area}}{\text{Conc. Area}}.$$

The area calculation in Equation 10 offers more precision because as an overall sample area it is much less sensitive to variation caused by detector noise and GPC settings on baseline and integration limits More importantly, the peak area calculation is not affected by the detector volume offsets. Similarly, the high-precision sample intrinsic viscosity (IV) is obtained by the area method shown in Equation 11:

$$IV = [\eta] \quad \text{(Eq. 11)}$$

$$= \sum_i w_i IV_i$$

$$= \sum_i \left(\frac{C_i}{\sum_i C_i}\right) IV_i$$

$$= \frac{\sum_i C_i IV_i}{\sum_i C_i}$$

$$= \frac{\sum_i DP_i}{\sum_i C_i}$$

$$= \frac{DP \text{ Area}}{\text{Conc. Area}},$$

where $DP_i$ stands for the differential pressure signal monitored directly from the online viscometer.

To determine the gpcBR branching index, the light scattering elution area for the sample polymer is used to determine the molecular weight of the sample. The viscosity detector elution area for the sample polymer is used to determine the intrinsic viscosity (IV or $[\eta]$) of the sample.

Initially, the molecular weight and intrinsic viscosity for a linear polyethylene standard sample, such as SRM1475a or an equivalent, are determined using the conventional calibrations for both molecular weight and intrinsic viscosity as a function of elution volume, per Equations 12 and 13:

$$Mw_{CC} = \sum_i \left(\frac{C_i}{\sum_i C_i}\right) M_i = \sum_i w_i M_i, \quad \text{(Eq. 12)}$$

and $$[\eta]_{CC} = \sum_i \left(\frac{C_i}{\sum_i C_i}\right) IV_i = \sum_i w_i IV_i. \quad \text{(Eq. 13)}$$

Equation 14 is used to determine the gpcBR branching index:

$$gpcBR = \left[\left(\frac{[\eta]_{CC}}{[\eta]}\right) \cdot \left(\frac{M_W}{M_{W,CC}}\right)^{\alpha_{PE}} - 1\right], \quad \text{(Eq. 14)}$$

where $[\eta]$ is the measured intrinsic viscosity, $[\eta]_{cc}$ is the intrinsic viscosity from the conventional calibration, $M_w$ is the measured weight average molecular weight, and $M_{w,cc}$ is the weight average molecular weight of the conventional calibration. The Mw by light scattering (LS) using Equation (10) is commonly referred to as the absolute Mw; while the Mw,cc from Equation (12) using the conventional GPC molecular weight calibration curve is often referred to as polymer chain Mw. All statistical values with the "cc" subscript are determined using their respective elution volumes, the corresponding conventional calibration as previously described, and the concentration ($C_i$) derived from the mass detector response. The non-subscripted values are measured values based on the mass detector, LALLS, and viscometer areas. The value of $K_{PE}$ is adjusted iteratively until the linear reference sample has a gpcBR measured value of zero. For example, the final values for $\alpha$ and Log K for the determination of gpcBR in this particular case are 0.725 and −3.355, respectively, for polyethylene, and 0.722 and −3.993 for polystyrene, respectively.

Once the K and $\alpha$ values have been determined, the procedure is repeated using the branched samples. The branched samples are analyzed using the final Mark-Houwink constants as the best "cc" calibration values and applying Equations 10-14.

The interpretation of gpcBR is straight forward. For linear polymers, gpcBR calculated from Equation 14 will be close to zero since the values measured by LS and viscometry will be close to the conventional calibration standard. For branched polymers, gpcBR will be higher than zero, especially with high levels of LCB, because the measured polymer $M_w$ will be higher than the calculated $M_{w,cc}$, and the calculated $IV_{cc}$ will be higher than the measured polymer IV. In fact, the gpcBR value represents the fractional IV change due the molecular size contraction effect as the result of polymer branching. A gpcBR value of 0.5 or 2.0 would mean a molecular size contraction effect of IV at the level of 50% and 200%, respectively, versus a linear polymer molecule of equivalent weight.

For these particular Examples, the advantage of using gpcBR in comparison to the g' index and branching frequency calculations is due to the higher precision of gpcBR. All of the parameters used in the gpcBR index determination are obtained with good precision and are not detrimentally affected by the low 3D-GPC detector response at high molecular weight from the concentration detector. Errors in detector volume alignment also do not affect the precision of the gpcBR index determination. In other particular cases, other methods for determining $M_w$ moments may be preferable to the aforementioned technique.

Unless otherwise stated, implicit from the context or conventional in the art, all parts and percentages are based on weight.

All applications, publications, patents, test procedures, and other documents cited, including priority documents, are fully incorporated by reference to the extent such disclosure is not inconsistent with the disclosed compositions and methods and for all jurisdictions in which such incorporation is permitted.

EXPERIMENTAL

Catalyst A

Zirconium, [2,2'''-[1,3-propanediylbis(oxy-κO)]bis[3'',5,5''-tris(1,1-dimethylethyl)-5'-methyl[1,1':3',1''-terphenyl]-2'-olato-κO]]dimethyl-, (OC-6-33)-. See Schematic 1 below.

Schematic 1

Example 1

A 100 ml stirred autoclave batch reactor was loaded with 302 micromol of MMAO-3A, and pressured with ethylene to 1400 bar. Subsequently, 0.0124 micromol of Catalyst A was added, with further ethylene to a pressure of 2100 bar. This catalyst system produced HDPE polymer for 5 minutes, as the pressure inside the reactor dropped to 1800 bar. During this first reaction, the reactor temperature was maintained at 250±5° C. Finally, 23 micromol of tert-butyl peroxyacetate free radical initiator was added to the reactor, with further ethylene, to increase the reactor pressure back to 2100 bar. Addition of the peroxide free radical was accompanied by an exotherm from 254-268° C. The free radical reaction was allowed to continue for a further 3 minutes, before the reactor was opened, and the polymer was collected. A total of 10.9 g of polymer was collected representing a 22% ethylene conversion. This polymer was characterized by DSC and TDGPC.

Comparative Example 1

A 100 ml stirred autoclave batch reactor was loaded with 302 micromol of MMAO-3A, and pressured with ethylene to 1400 bar. Subsequently, 0.0124 micromol of Catalyst A was added, with further ethylene, to a pressure of 2100 bar. This catalyst system produced HDPE polymer for 5 minutes, as the pressure inside the reactor dropped to 1800 bar. During this first reaction, the reactor temperature was maintained at 250±5° C. After this time, the reactor was opened and the polymer was collected. A total of 9.7 g of polymer was collected representing a 19.6% ethylene conversion. This polymer was characterized by DSC and TDGPC.

DSC of Example 1 and Comparative Example 1

Figure 1:
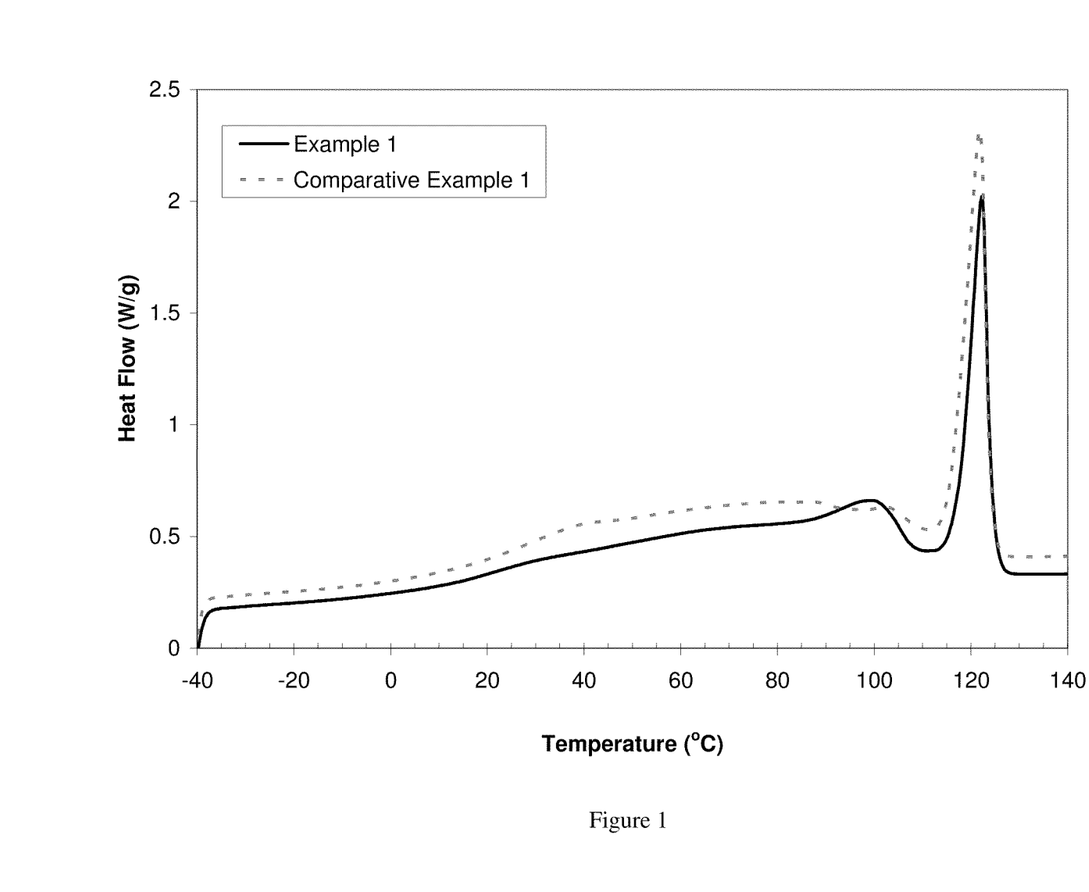
FIG. 1 depicts two DSC (Differential Scanning Calorimetry) profiles of an inventive example and a comparative example, respectively.
Figure 2:
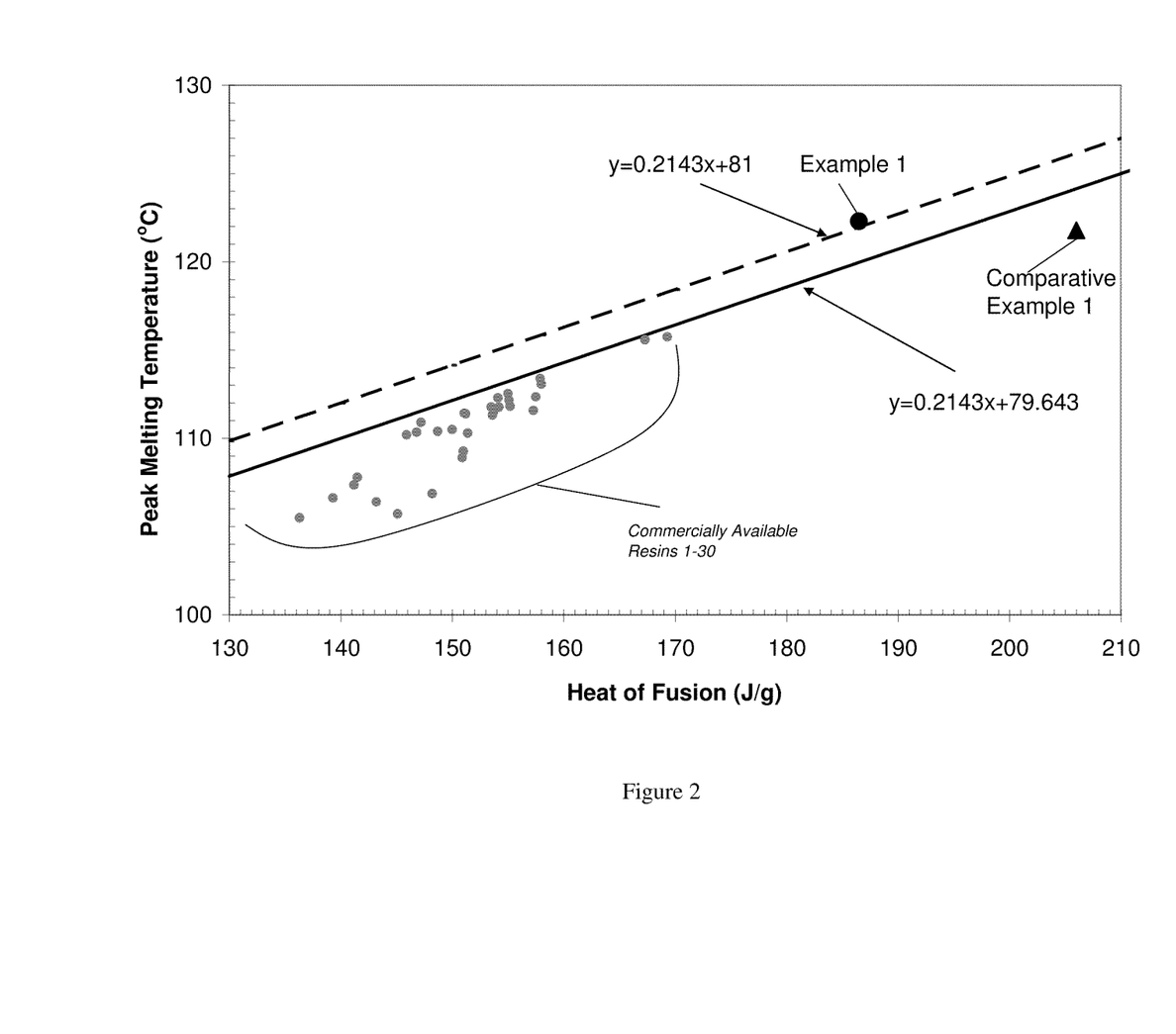
FIG. 2 depicts "Peak melting Temperature versus Heat of Fusion" for an inventive example and a comparative example. The corresponding data points of thirty commercially available LDPE resins are also shown in this figure.

The DSC results for Example 1 and Comparative Example 1 are shown in Table 1 and FIG. 1. From Table 1 and FIG. 1, Comparative Example 1 (HDPE) has a higher heat of fusion and % crystallinity, and correspondingly Example 1 has a lower heat of fusion and lower % crystallinity, being indicative of less HDPE in the polymer. FIG. 2 shows a plot of the "highest peak melting temperature versus the heat of fusion" for Example 1 and Comparative Example 1, as compared to results from WO 2009/114661. Example 1 is shown by that method to be an inventive example, whereas Comparative Example 1 is not.

TABLE 1

Melting Temperatures ($T_m$), Heat of Fusion, % Crystallinity, and Crystallization Temperature ($T_c$) from DSC of Example 1 and Comp. Example 1.

| | $T_{m1}$ (° C.) | $T_{m2}$ (° C.) | $T_{m3}$ (° C.) | Heat of Fusion (J/g) | % Cryst. | $T_c$ (° C.) |
|---|---|---|---|---|---|---|
| Example 1 | 122.3 | 99.5 | | 186.5 | 63.9 | 110.4 |
| Comparative Example 1 | 121.8 | 102.6 | 86.6 | 206.0 | 70.5 | 111.0 |

TDGPC of Example 1 and Comparative Example 1

Figure 3:
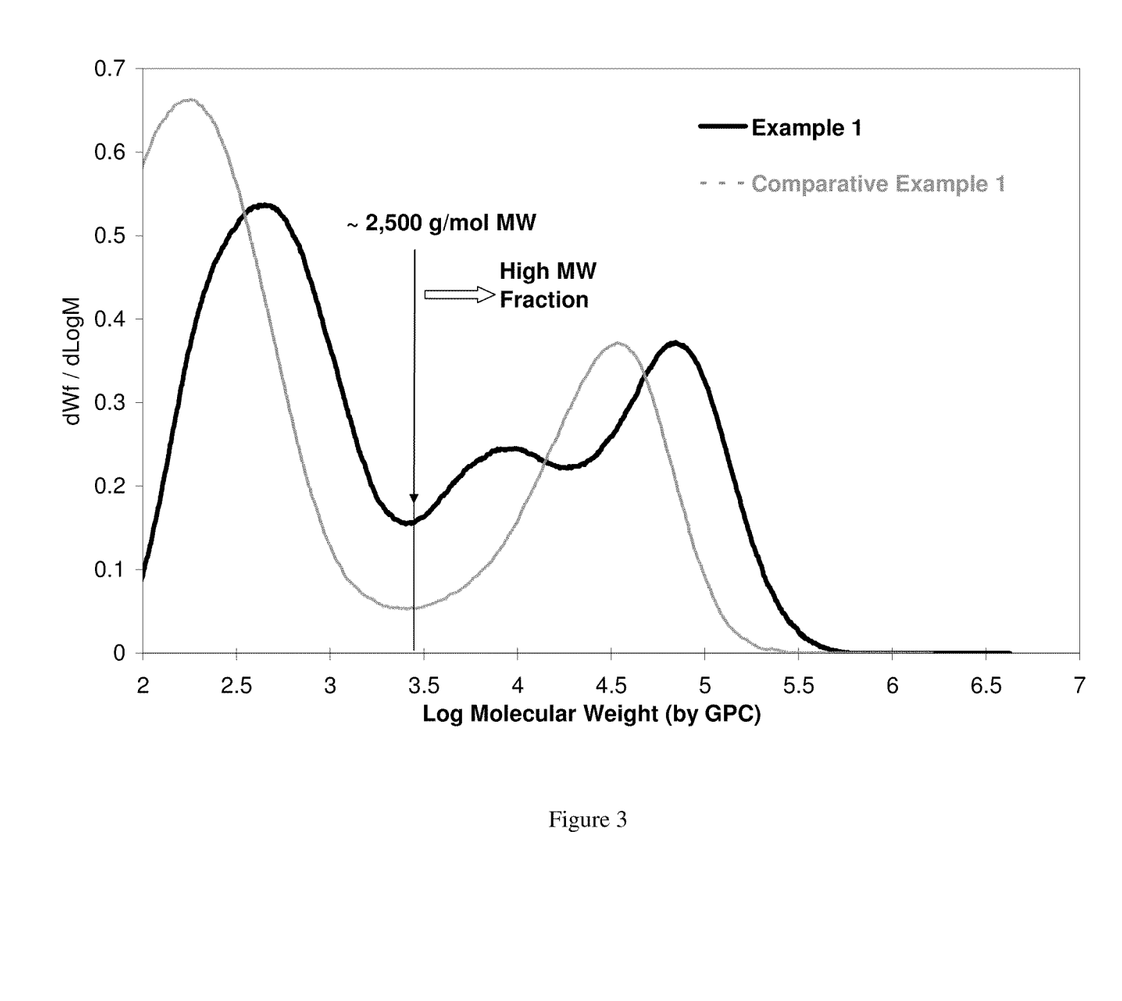
FIG. 3 depicts two GPC (Gel Permeation Chromatography) elution profiles of an inventive example and a comparative example, respectively.

Both Example 1 and Comparative Example 1 were analyzed by the 3D-GPC technique as described above. The molecular weight distribution (MWD) results were calculated in two ways, as shown in the FIG. 3: (1) across the entire GPC elution curve for the whole sample, and (2) over a portion of the GPC elution curve having molecular weight (MW) higher than 2,500 g/mol.

Table 2 shows the addition of the peroxide to the reactor condition of Example 1 created higher MW components in Example 1, due to grafting, as compared to Comparative Example 1. This conclusion is further supported by the results where only the high MW portion of the GPC curves was analyzed. Along with the weight average molecular weight (Mw) increase, the polydispersity or molecular weight distribution (Mw/Mn) value also increased from 2.10 (for Comparative Example 1) to a value of 3.78 (for Example 1). Example 1 also has a bimodal MWD profile over 2,500 g/mol. The increase of the gpcBR value for Comparative Example 1 (0.151) to a value of 0.335 for Example 1, represents an increase in long chain branching (LCB), which is consistent with the presence of grafting caused by the peroxide addition. This LCB index of gpcBR derived from the 3D-GPC experiment has been described above. The "Mass Recovery" column in Table 2 for the "Whole Sample" is a measure of the sample recovery in a GPC experiment; this recovery shown (97 and 99% are very good). For the "High MW Fraction Only" samples, the weight fraction of the high-MW fractions in the whole sample is shown.

TABLE 2

Triple Detector Gel Permeation Chromatography (TDGPC) results of "Whole Sample" and "High MW Fraction Only" of Example 1 and Comparative Example 1.

| Whole Sample | Mn (g/mol) | Mw (g/mol) | Mw/Mn | gpcBR | Mass Recovery |
|---|---|---|---|---|---|
| Example 1 | 660 | 25,740 | 39.00 | 0.496 | 96.68% |
| Comparative Example 1 | 220 | 11,720 | 53.27 | 0.517 | 98.69% |

| High MW Fraction Only | Mn (g/mol) | Mw (g/mol) | Mw/Mn | gpcBR | Weight Fraction High MW Fraction |
|---|---|---|---|---|---|
| Example 1 | 13,910 | 52,610 | 3.78 | 0.335 | 46.71% |
| Comparative Example 1 | 16,480 | 34,590 | 2.10 | 0.151 | 32.87% |

We claim:
1. A process, comprising:
(A) polymerizing ethylene in the presence of a catalyst to form a crystalline ethylene-based polymer having a crystallinity of at least 50% as determined by DSC Crystallinity in a first reactor or a first part of a multi-part reactor; and
(B) reacting the crystalline ethylene-based polymer of (A) with additional ethylene in the presence of a free-radical initiator to form an ethylenic polymer in at least one other reactor or a later part of a multi-part reactor, wherein the catalyst of (A) is a metal complex of a polyvalent aryloxyether corresponding to the formula:

where $M^3$ is Hf or Zr;

$Ar^4$ independently each occurrence is a substituted $C_{9-20}$ aryl group, wherein the substituents, independently each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks co-planarity with the aryl group to which it is attached;

$T^4$ independently each occurrence is a $C_{2-20}$ alkylene, cycloalkylene or cycloalkenylene group, or an inertly substituted derivative thereof;

$R^{21}$ independently each occurrence is hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ independently each occurrence is hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$, independently each occurrence is halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group.

2. The process of claim 1, where the reaction of step (B) occurs by graft polymerization.

3. The process of claim 1, where polar compounds, if present in the first reactor or the first part of a multi-part reactor, do not inhibit the activity of the metallocene catalyst.

4. A process, comprising:
(A) polymerizing ethylene in the presence of a catalyst to form a crystalline ethylene-based polymer having a crystallinity of at least 50% as determined by DSC Crystallinity in a first reactor or a first part of a multi-part reactor; and
(B) reacting the crystalline ethylene-based polymer of (A) with additional ethylene in the presence of a free-radical initiator to form an ethylenic polymer in at least one other reactor or a later part of a multi-part reactor, wherein the catalyst of (A) is a metal complex of a polyvalent aryloxyether corresponding to the formula:

where $M^3$ is Ti;

$Ar^4$ independently each occurrence is a substituted $C_{9-20}$ aryl group, wherein the substituents, independently each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks co-planarity with the aryl group to which it is attached;

$T^4$ independently each occurrence is a $C_{2-20}$ alkylene, cycloalkylene or cycloalkenylene group, or an inertly substituted derivative thereof;

$R^{21}$ independently each occurrence is hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ independently each occurrence is hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$, independently each occurrence is halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group.

5. The process of claim 1 or 4, wherein each polymerization step (A) and (B) comprises a high pressure polymerization process.

6. The process of claim 1 or 4, wherein step (A) is performed at a temperature of from about 50 to about 350° C.

7. The process of claim 1 or 4 wherein step (A) is performed at a pressure of from about 100 psi to about 60,000 psi.

8. An ethylenic polymer formed by a process comprising:
(A) polymerizing ethylene in the presence of a catalyst to form a crystalline ethylene-based polymer having a crystallinity of at least 50%, as determined by DSC Crystallinity, in a first reactor or a first part of a multi-part reactor; and (B) reacting the crystalline ethylene-based polymer of (A) with additional ethylene, in the presence of a free-radical initiator, to form an ethylenic polymer in at least one other reactor or a later part of a multi-part reactor, wherein the catalyst of (A) is a metal complex of a polyvalent aryloxyether corresponding to the formula:

where $M^3$ is Ti, Hf or Zr;

$Ar^4$ independently each occurrence is a substituted $C_{9-20}$ aryl group, wherein the substituents, independently each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks co-planarity with the aryl group to which it is attached;

$T^4$ independently each occurrence is a $C_{2-20}$ alkylene, cycloalkylene or cycloalkenylene group, or an inertly substituted derivative thereof;

$R^{21}$ independently each occurrence is hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ independently each occurrence is hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$, independently each occurrence is halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group, and wherein the ethylenic polymer has a gpcBR value greater than 0.05; and wherein the ethylenic polymer has a molecular weight distribution from 30 to 50.

9. The ethylenic polymer of claim 8, wherein $M^3$ is Ti.

10. The ethylenic polymer of claim 8, wherein $M^3$ is Zr.

* * * * *